Patented Oct. 15, 1940

2,217,698

UNITED STATES PATENT OFFICE 2,217,698

CANNED FOOD PRODUCT AND CANNING METHOD

Albert Musher, New York, N. Y., assignor to Musher Corporation, Elizabeth, N. J., a corporation of New Jersey No Drawing. Application May 24, 1937, Serial No. 144,542

6 Claims. (Cl. 99—144)

This invention relates to packaged food products, and particularly to food products sold in sealed containers, and to methods of producing such products.

Many canned food products, particularly of fish origin, such as salmon, tuna fish, sardines, etc., are packaged in oil vehicles. In many instances, the oil vehicle is discarded when consuming such food product, as is true, for example, in connection with canned salmon and canned tuna fish. Although much of such canned fish product is utilized in salads, the oil vehicle in which the goods are packaged is discarded, and not generally considered desirable for use.

Other types of food products packaged for salad use, including fruit salad, vegetable salad, etc., are packaged as such without any vehicle other than the watery material which may be present naturally in such fruit and vegetable compositions, or by the use of sugar syrups, etc. Although such products are utilized primarily for salad purposes, only the aqueous or syrupy vehicles have been employed.

Among the objects of the present invention, there is included the production of packaged and canned food products, such as fish products and fruit and vegetable products, particularly useful for salad purposes, in which a dressing is utilized as the packaging vehicle.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, the desired food material, particularly suitable for salad use, including fish products, such as tuna fish, salmon, sardines, etc., and vegetable and fruit materials, or mixtures useful for the production of the desired types of salads, are intermixed with the dressing materials desired in the ultimate salad use, so that the product as taken from the packaged container, which may be a hermetically sealed container, such as is used for canned goods generally, is directly usable by the consumer.

It has been found by utilizing salad dressing, consisting or composed in large part of an emulsion-like combination of a non-liquid hard fat and water, that such dressings may be placed into a can or jar, for instance, to coat or encompass meats, fish, potato salad and so forth, and that this can or jar may then be subjected to heat or sterilization treatment without the expected disagreeable separation or segregation that usually results when various standard liquid oil containing dressings are sterilized at elevated temperatures.

Thus while mayonnaise or salad dressings containing a liquid oil can be employed as additions to these food products, they do not lend themselves to use with canned goods or packaged goods which are subjected to sterilization operations. Most of the canned goods are subjected to heat sterilization after packaging. If liquid oil mayonnaise has been incorporated into the food product before such heat sterilization, the heat necessary for sterilization purposes breaks down the emulsion of ordinary liquid oil mayonnaise or salad dressings with the result that there is free oil in the cans as well as free moisture components, and there is general segregation of such elements from the dressing material. This is due to the fact when ordinary liquid oil mayonnaise or salad dressing is heated, the emulsion separates or breaks.

By the utilization of hard-fat-containing salad dressings, particularly those having fat components or fat and oil mixtures, whose melting point ranges from approximately 65 or 70 to 120° F., or even higher, the difficulties encountered with separation of oil in ordinary mayonnaise are eliminated insofar as direct use of the product for salad purposes becomes possible. With such hard-fat-containing salad dressing there is no undesirable segregation of oil, moisture, etc., but the dressing is still distributed substantially uniformly throughout the food product. Results are thus secured by the use of hard-fat-containing dressing materials of particular value in making it possible to sell canned and other packaged products for salad use directly in which the dressing material is already present and disseminated throughout the food product.

In carrying out the present invention, the food products employed for canning purposes, for example, may be subjected to the usual cooking operations in oil or water, or whatever medium is normally employed for such canning operation, and the fluid used for such cooking purposes may then be drained off, and the hard-fat-containing salad dressing product applied to the cooked material, after which the usual canning operation proceeds. In such cases, it is not necessary that all of the cooking medium employed for cooking the food product be drained off.

On the other hand, if desired instead of following the usual cooking operation with the normal cooking medium employed in producing such products for canning operations, the hard-fat-containing salad dressing itself may be utilized as the canning medium. Thus instead of utilizing the oil normally employed in the canning of sardines, tuna fish, etc., such oil may be replaced with the solid salad dressing material because of the temperatures employed for sterilization purposes such salad dressing material is liquid enough to enable the usual cooking and processing operations to be carried out. These methods particularly lend themselves to the treatment of products, such as potato salad, which do not require a high heat treatment in processing, but may be utilized throughout in the canning of various types of products including sardines, tuna fish, salmon, etc., and the various fruit salad compositions and vegetable salad compositions.

The use of the hard-fat-containing salad dressing in connection with such canned products is particularly important, and leads to a number of desirable characteristics and properties. Hard-fat-containing salad dressings employed in connection with the food products are far preferable to the ordinary mayonnaise or salad dressings of substantially liquid consistency, because the hard-fat-containing salad dressing does not penetrate as much into the inside fibers of the food, in which case not only does less salad dressing have to be employed, but there is less tendency to the product becoming soggy. The products, therefore, exhibit better firmness and body than those ordinarily produced, even when the liquid oil dressings are applied to the packaged products after removal from the cans.

Furthermore, since as pointed out, the substantially hard-fat-containing salad dressings may be employed in lieu of the vegetable or animal oils employed in the canning of sardines, tuna fish, canned meats, etc., firmer and less soggy products are obtained because of the lesser penetration of the hard-fat-containing dressing into the food products themselves than is the case where the liquid oils penetrate throughout the entire fish or food products.

These dressings may be employed as substitutes in whole or in part for any of the vegetable or animal oils, or liquid or semi-hardened fats or oils, whether animal or vegetable, employed in the packaging of such products; or as substitutes for the water or aqueous materials or vegetable or fruit juices normally used in packaging vegetable and fruit products. The hard-fat-containing salad dressings employed may take any desired form, including variations of dressings, such as mustard dressing, chili dressing, tomato dressing, etc.

As exemplary of the types of hard-fat-containing salad dressings that may be employed in accordance with the present invention, any dressing material having a melting point in its fat constituents ranging from approximately 70 to 120° F. may be employed. The fats or oils employed in such dressing may vary in character, and be of any desired type, including animal and vegetable oils, as well as hydrogenated or partially hydrogenated oils or fats, or various mixtures of such ingredients may be employed. The fatty component employed in producing such hard-fat-containing salad dressings may be an individual fat or oil, or hardened fat or oil, or mixtures of various types, and such oils or fats may be chosen generally from the vegetable and animal type oils, including olive oil, cottonseed oil, corn oil, cocoanut oil, peanut oil, oleo oil, oleo stock, oleo stearin, neutral lard, and their hydrogenated or partially hydrogenated derivatives. With such harder fat components, there may be incorporated the usual condiments, including vinegar, salt, mustard, sugar, pepper, lemon juice, and emulsifying agents.

For example, an oil-in-water emulsion may be prepared with any liquid oil, vegetable, animal or mineral, utilizing from 15 to 20% of oil and 85% of water, or from 85% of oil to 35% of water, employing the usual emulsifying agents, such as egg yolk, gums like gum tragacanth, etc., and containing the usual condiments or additions employed for salad dressing purposes. Such oil-in-water emulsions may be prepared in the usual way by admixing the materials as desired. The oil-in-water emulsion thus produced may then be incorporated with a relatively hard fatty component, consisting of fats or oils or mixtures thereof, having a melting point between 80 and 120° F., but more desirably in the range of 95 to 98° F. 65% of such hard fat may thus be incorporated with 35% of the oil-in-water emulsion, and the components admixed together. The result is a product of substantially solid consistency at the temperatures normally prevailing in household refrigerators, but of somewhat more liquid character at ordinary room temperatures. The proportions given may be varied widely, but the components should be chosen so that either at room temperatures or the slightly lower temperatures of household refrigerators, a substantially solid product is obtained.

More desirable types of dressings or packaging vehicles include those in which water-absorbent bodying components are present. Thus substantially solid dressing compositions may be produced utilizing water-absorbent bodier components, particularly thickeners, etc., commonly used in the production of food products, including such materials as the starches, specifically corn starch, tapioca, agar agar, pectin, gelatine, the albumens and water-soluble gums, for example, tragacanth, arabic, karaya, etc. Such water-absorbent bodier compounds are desirably converted into a thick paste with water or aqueous materials, such as water and vinegar, and then utilized as a material into which a hard fat of the consistency referred to above may be incorporated, together with condiments, flavoring ingredients, etc., as desired.

The following example will illustrate the production of a substantially solid salad dressing material embodying a water-absorbent bodier component.

85 parts by weight of tapioca flour or corn starch are heated with 320 parts by weight of water to form a thick paste, and the usual desired condiments, such as salt, sugar, mustard, etc., incorporated, utilizing, for example 150 parts by weight of such condiments. After incorporation of the condiments, the substantially hard fat of the character set forth may be incorporated utilizing, for example, 900 parts by weight. If desired, there may be a final addition also of a vinegar and water composition carrying some thickener, such as 20 parts by weight of tapioca with 200 parts of water-vinegar composition, and also together with 20 parts by weight of gelatine or pectin. The resulting composition has the desired consistency of being substantially solid but pliable and pasty at ordinary temperatures, and may desirably be employed in the production of the canned or packaged articles as set forth above.

These hard-fat-containing dressings may be converted into various modifications including substantially solid French dressing, Hollandaise dressing, etc., by variation of the ingredients employed, following the general procedures set forth above.

In the example of the hard-fat-containing salad dressing material given above, if in lieu of the condiments normally employed in the production of mayonnaise or salad dressing compositions, dry mustard is substituted in the desired amount, a mustard spread is produced that can desirably be employed for the packaging of many of these products, particularly of fish and animal character.

In fact, a food base material can be employed which can be utilized for conversion into a variety of types of products for use as a packaging vehicle in connection with the present invention. Such food base material can be produced from the tapioca flour or corn starch with water, and incorporation with the hard fat along the lines given above in the particular example of the production of the hard-fat-containing salad dressing, such food base being made, however, without the indicated condiments, or final addition of gelatine or pectin, etc. Thus a food base may be made from 85 parts by weight of tapioca flour or corn starch heated with 320 parts by weight of water or more if necessary to form a thick paste, and such material incorporated with a hard fat of the character set forth above utilizing, for example, 900 parts by weight. This material is a food base of pliable character that can be utilized by the addition of various flavoring materials, condiments, etc., to be converted into any desired type of product. The food base material can be made up as such, and the desired flavoring materials incorporated therein, or the flavoring materials can be incorporated into the product at intermediate stages, for example, into the water paste of starch, etc. before the incorporation of the hard fat.

Thus a solid honey-type product for use in connection with fruit salad, for example, can be produced by incorporating honey and water (using about 50% of water based on the amount of honey) with from 10 to 15% by weight of cornstarch, cooking the product to a pasty condition, and then adding a hard fat of the character set forth above in an amount of 90% based on the weight of honey present.

Or a marshmallow flavored vehicle may be produced, the marshmallow material itself serving as the water-absorbent bodier in view of its content of gums. For example, marshmallow and water if required (for example, 20% based on the amount of marshmallow) may be whipped and incorporated with about 40% of a melted hard fat, desirably beaten into the marshmallow material with slow addition of the fat during the beating operation, and such marshmallow type product utilized as the vehicle for fruit salad, etc.

The emulsion-like product which is utilized according to the present invention seems to possess an extraordinary high degree of stability in that, although it may be melted during the high temperature sterilization process, upon cooling and agitating it is immediately restored to substantially its original desired shape and form or with substantially all of its desirable characteristics. When the hard fat and aqueous materials are combined together under the conditions set forth above, a water-in-fat emulsion appears to form with the fat in the continuous phase as contrasted to the usual liquid oil-in-water emulsion with the water in the continuous phase. The former type of emulsion appears to be much more stable after high temperature treatment than the latter under the conditions described.

The addition of substantial quantities of starch or other water absorbent bodier materials in the presence of sufficient amounts of water or aqueous material to gelatinize them, also appears to aid the stability of the emulsion-like product. Where a liquid oil emulsion, such as ordinary salad dressing is employed, the oil and water tend to separate and segregate when the canned product is subjected to elevated temperature and a satisfactory canned product cannot be obtained by the use of these liquid oil emulsions or dispersions.

Having thus set forth my invention, I claim:

1. A process of preparing heated food compositions which process comprises incorporating together the food composition in the form of particles with an emulsion-like dressing material formed of a mixture of a hard fat and an aqueous material together with condiments, hermetically sealing the same in a container, subjecting the container to a heat treatment at an elevated temperature and then cooling with agitation, said final dressing being substantially devoid of segregation or separation and said food composition retaining substantially all of its original desirable characteristics.

2. A process of preparing heated food compositions which process comprises incorporating together the food composition in the form of particles with an emulsion-like dressing material formed of a mixture of a hard fat and an aqueous material together with condiments, hermetically sealing the same in a container, subjecting the container to a heat treatment at an elevated temperature and then cooling with agitation, said final dressing being substantially devoid of segregation or separation and said food composition retaining substantially all of its original desirable characteristics, said dressing also containing starch and sufficient aqueous material to gelatinize said starch into a thick paste.

3. A process of preparing a heated fish salad composition which process comprises incorporating together the fish salad composition in the form of particles with an emulsion-like salad dressing material formed of a mixture of a hard fat and an aqueous material together with condiments, hermetically sealing the same in a container, subjecting the container to a heat treatment at an elevated temperature and then cooling with agitation, said final salad dressing being substantially devoid of segregation or separation and said fish salad composition retaining substantially all of its original desirable characteristics.

4. A process of preparing a heated meat salad composition which process comprises incorporating together the meat salad composition in the form of particles with an emulsion-like salad dressing material formed of a mixture of a hard fat and an aqueous material together with condiments, hermetically sealing the same in a container, subjecting the container to a heat treatment at an elevated temperature and then cooling with agitation, said final salad dressing being substantially devoid of segregation or separation and said meat salad composition retaining substantially all of its original desirable characteristics.

5. A process of preparing a heated potato salad composition which process comprises incorporating together the potato salad composition in the form of particles with an emulsion-like salad dressing material formed of a mixture of a hard fat and an aqueous material together with condiments, hermetically sealing the same in a container, subjecting the container to a heat treatment at an elevated temperature and then cooling with agitation, said final salad dressing being substantially devoid of segregation or separation and said potato salad composition retaining substantially all of its original desirable characteristics.

6. A process of preparing heated food compositions which process comprises incorporating together the food composition in the form of particles with an emulsion-like dressing material formed of a mixture of a hard fat and an aqueous material together with condiments, hermetically sealing the same in a container, subjecting the container to a heat treatment at an elevated temperature and then cooling, said final dressing being substantially devoid of segregation or separation and said food composition retaining substantially all of its original desirable characteristics.

ALBERT MUSHER.